(12) United States Patent
Xu et al.

(10) Patent No.: US 10,844,289 B2
(45) Date of Patent: Nov. 24, 2020

(54) CHEMICAL LOOPING PROCESSES FOR CATALYTIC HYDROCARBON CRACKING

(71) Applicant: Saudi Arabian Oil Company, Dhahran (SA)

(72) Inventors: Wei Xu, Dhahran (SA); Ibrahim Abba, Dhahran (SA); Rodrigo Sandoval Rivera, Thuwal (SA); Ola Ali, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/113,184

(22) Filed: Aug. 27, 2018

(65) Prior Publication Data
US 2019/0062642 A1 Feb. 28, 2019

Related U.S. Application Data

(60) Provisional application No. 62/551,014, filed on Aug. 28, 2017.

(51) Int. Cl.
*C10G 11/14* (2006.01)
*B01J 29/48* (2006.01)
(Continued)

(52) U.S. Cl.
CPC ............... *C10G 11/14* (2013.01); *B01J 29/46* (2013.01); *B01J 29/48* (2013.01); *C10G 11/04* (2013.01);
(Continued)

(58) Field of Classification Search
CPC .......... C10G 11/14; C10G 11/16; C10G 11/04; C10G 2300/4006; B01J 29/46; B01J 29/48
See application file for complete search history.

(56) References Cited

U.S. PATENT DOCUMENTS 3,856,659 A 12/1974 Owen
6,743,961 B2 6/2004 Powers
(Continued)

FOREIGN PATENT DOCUMENTS

CN 1876766 A 12/2006
CN 101469275 A 7/2009
(Continued)

OTHER PUBLICATIONS

Basily, "Metal-catalyzed two-stage pyrolysis 2. Role of Different catalysts in the production and composition of ethylene/propylene-enriched gases", Journal of Analytical and Applied Pyrolysis, vol. 32, pp. 213-219, 1995.
(Continued)

*Primary Examiner* — Ali Z Fadhel
(74) *Attorney, Agent, or Firm* — Dinsmore & Shohl LLP

(57) ABSTRACT

Methods of chemical looping include introducing a hydrocarbon-containing feed stream into a first reaction zone. The first reaction zone includes a moving catalyst bed reactor. The moving catalyst bed reactor includes a heterogeneous catalyst, and the heterogeneous catalyst includes a heat-generating metal oxide component. The method further includes cracking the hydrocarbon-containing feed stream in the presence of the heterogeneous catalyst of the moving catalyst bed reactor, reducing the metal oxide heat-generating component of the heterogeneous catalyst with hydrogen from a product stream to generate heat, and utilizing the heat to drive additional cracking of the hydrocarbon-containing feed stream. A chemical looping system includes at least one reduction reactor, which includes a moving catalyst bed reactor and a heterogeneous catalyst, and at least one oxidation reactor fluidly coupled to the reduction reactor.

20 Claims, 4 Drawing Sheets

(51) Int. Cl.
  *B01J 29/46* (2006.01)
  *C10G 11/04* (2006.01)
  *C10G 11/16* (2006.01)

(52) U.S. Cl.
  CPC ...... *C10G 11/16* (2013.01); *C10G 2300/4006* (2013.01)

(56) References Cited

U.S. PATENT DOCUMENTS

| | | |
|---|---|---|
| 6,979,757 B2 | 12/2005 | Powers |
| 7,019,187 B2 | 3/2006 | Powers |
| 7,374,664 B2 | 5/2008 | Powers |
| 7,396,449 B2 | 7/2008 | Powers |
| 7,404,889 B1 | 7/2008 | Powers |
| 7,550,642 B2 | 6/2009 | Powers |
| 2001/0016673 A1 | 8/2001 | Bridges et al. |
| 2008/0277314 A1 | 11/2008 | Halsey |
| 2008/0308455 A1* | 12/2008 | Long .................... B01J 27/1853 208/120.35 |
| 2009/0048475 A1 | 2/2009 | Powers |
| 2009/0050523 A1 | 2/2009 | Halsey |
| 2013/0338418 A1* | 12/2013 | Xu ........................... C07C 4/06 585/400 |
| 2014/0275673 A1 | 9/2014 | Long et al. |

FOREIGN PATENT DOCUMENTS

| | | |
|---|---|---|
| CN | 101591562 A | 12/2009 |
| CN | 101597511 A | 12/2009 |
| CN | 101683621 A | 3/2010 |
| EP | 0381870 A1 | 8/1990 |
| WO | 2009025695 A2 | 2/2009 |
| WO | 2016123711 A1 | 8/2016 |

OTHER PUBLICATIONS

Basily, "The catalytic pyrolysis of the Egyptian bitumen for industrial production raw material", Journal of Analytical and Applied Pyrolysis, vol. 76, pp. 24-31, 2006.
Focus on Catalysts, vol. 2006, Issue 11, Nov. 2006, p. 6.
Search Report and Written Opinion pertaining to International Patent Application Serial No. PCT/US2018/047165 dated Nov. 15, 2018.

* cited by examiner

CHEMICAL LOOPING PROCESSES FOR CATALYTIC HYDROCARBON CRACKING

CROSS REFERENCE TO RELATED APPLICATION

This application claims the benefit of U.S. Provisional Application Ser. No. 62/551,014 filed Aug. 28, 2018.

BACKGROUND

Field

The present specification generally relates to hydrocarbon processing.

Technical Background

Current commercial technologies for production of light olefins, such as ethylene and propylene, include thermal cracking or steam cracking as well as catalytic cracking. Steam cracking is a non-catalytic process that operates at elevated reaction temperatures of approximately 750° C.-900° C. and requires steam dilution to control selectivity and maintain acceptable loop life. It is by far the most energy consuming process in the chemical industry. It was found that the pyrolysis section of a naphtha steam cracker alone consumes approximately 65% of the total process energy and accounts for approximately 75% of the total energy loss. Moreover, the process is extremely sensitive to feed variations and raises several environmental concerns. It is not suitable for meeting the anticipated growing demand of propylene as it produces ethylene as the primary product and it allows very little control over propylene to ethylene (P/E) ratio.

Conversely, catalytic cracking, particularly, fluidized catalytic cracking (FCC) with solid acid catalysts, produces products with relatively higher P/E ratios and operates at lower temperatures of 500-650° C. In the FCC process, the catalyst is suspended in a rising flow of feed hydrocarbons in a fluidized bed. Pre-heated hydrocarbon feed is sprayed into the base of the frustum/riser via feed nozzles where it contacts hot fluidized catalysts at 500-650° C. The hot catalysts vaporize the feed and catalyze the cracking reactions to break down the high molecular weight molecules into lighter components including liquid petroleum gas (LPG), gasoline, and diesel. The "spent" catalyst then flows into a fluidized-bed regenerator where air or in some cases air plus oxygen is used to burn off the coke to restore catalyst activity and also provide the necessary heat for the next reaction cycle. The "regenerated" catalyst then flows to the base of the riser, repeating the cycle.

The hydrocarbon cracking industry has invested significant efforts to maximize the energy efficiency of endothermic hydrocarbon conversion processes, especially cracking, without compromising yields and conversion. For example, FCC is ideally thermo-neutral where coke combustion in the regenerator fuels the endothermic cracking reaction. In reality, however, this heat generated from coke combustions is often insufficient, especially for lighter feeds with high hydrogen/carbon (H/C) ratios. Several techniques have previously been employed to overcome energy deficiencies such as injecting excess air to promote complete combustion. However, injecting excess air significantly increases side reactions as well as operating and capital costs. Alternatively, injection of a calculated amount of an aromatic heavy fuel, known as torch oil, to the regenerator section has been attempted to provide additional thermal energy. This method, while effective, usually results in the formation of non-oxidized cracked products. The non-oxidized cracking products may cause formation of hot spots in the catalyst bed, which, in the presence of steam, could cause deactivation and local permanent damages to the catalyst bed.

SUMMARY

In view of the foregoing background, a need exists for processes and systems that efficiently crack hydrocarbons into olefins and aromatics. This is accomplished in embodiments disclosed in this description by making systems and methods more efficient by generating heat by using a heat-generating component in a heterogeneous catalyst to generate heat in reduction and oxidation reactions that occur during hydrocarbon cracking and catalyst regeneration, respectively, and using that heat to crack hydrocarbons.

According to one or more embodiments, a method of chemical looping includes: introducing a hydrocarbon-containing feed stream into a first reaction zone, the first reaction zone being a moving catalyst bed reactor. The moving catalyst bed reactor includes a heterogeneous catalyst, and the heterogeneous catalyst includes a metal oxide heat-generating component. The method further includes cracking the hydrocarbon-containing feed stream in the presence of the heterogeneous catalyst of the moving catalyst bed reactor to yield a product stream comprising olefins, aromatics, and hydrogen, reducing the metal oxide heat-generating component of the heterogeneous catalyst (the metal oxides can be reduced by hydrogen or other cracking product (light olefins and paraffins))to generate heat, and utilizing the heat to drive additional cracking of the hydrocarbon-containing feed stream.

According to other embodiments, a chemical looping system includes at least one reduction or cracking reactor that includes a moving catalyst bed reactor and a heterogeneous catalyst within the moving catalyst bed reactor. The heterogeneous catalyst includes a metal oxide heat-generating component. The reduction reactor is configured to crack a hydrocarbon-containing feed stream to produce product stream comprising olefins, aromatics, and hydrogen, smaller paraffins, CO, $CO_2$, and unreacted feed and reduce the metal oxide heat-generating component of the heterogeneous catalyst to generate heat. The system further includes at least one oxidation or regeneration reactor coupled to the reduction reactor, where the oxidation reactor is configured to receive reduced heterogeneous catalyst from the reduction reactor, oxidize the reduced metal oxide component of the heterogeneous catalyst, and simultaneously burn the coke deposited on the catalyst during the cracking process using an oxygen containing gaseous feed ($O_2$, Air, or the like). Both processes, (i.e., coke burning and metal oxide re-oxidation) generate heat and transfer the oxidized heterogeneous catalyst to the reduction reactor.

Additional features and advantages of the embodiments described in this disclosure will be set forth in the detailed description which follows, and in part will be readily apparent to those skilled in the art from that description or recognized by practicing the embodiments described in this disclosure, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described in this disclosure and together with the description serve to explain the principles and operations of the claimed subject matter.

DETAILED DESCRIPTION

Embodiments of chemical looping processes for catalytic hydrocarbon cracking and systems for conducting the same will be described. The chemical looping for oxidative catalytic hydrocarbon cracking may, in embodiments, comprise introducing a hydrocarbon-containing feed stream into a first reaction zone, the first reaction zone comprising a moving catalyst bed reactor, where the moving catalyst bed reactor comprises a heterogeneous catalyst. The heterogeneous catalyst comprises a metal oxide heat-generating component. The process further comprises cracking the hydrocarbon-containing feed stream in the presence of the heterogeneous catalyst of the moving catalyst bed reactor to yield a product stream comprising olefins, aromatics, and hydrogen; reducing the metal oxide heat-generating component of the heterogeneous catalyst to generate heat; and utilizing the heat to drive additional cracking of the hydrocarbon-containing feed stream. Systems for chemical looping processes for oxidative catalytic hydrocarbon cracking are also discussed in embodiments.

Specific embodiments of systems and processes for chemical looping according to embodiments will now be described with reference to the drawings. It should be understood that the chemical looping systems depicted in the figures are meant to be illustrative of non-limiting embodiments of systems that may be used in the processes. It should be further understood that the chemical looping systems may be altered in numerous ways yet still remain capable of performing the processes described in this disclosure. As used in embodiments, measurements such as temperature and pressure refer to the average temperature and pressure within a reaction zone, or other designated volumetric unit, unless otherwise indicated.

Figure 1:
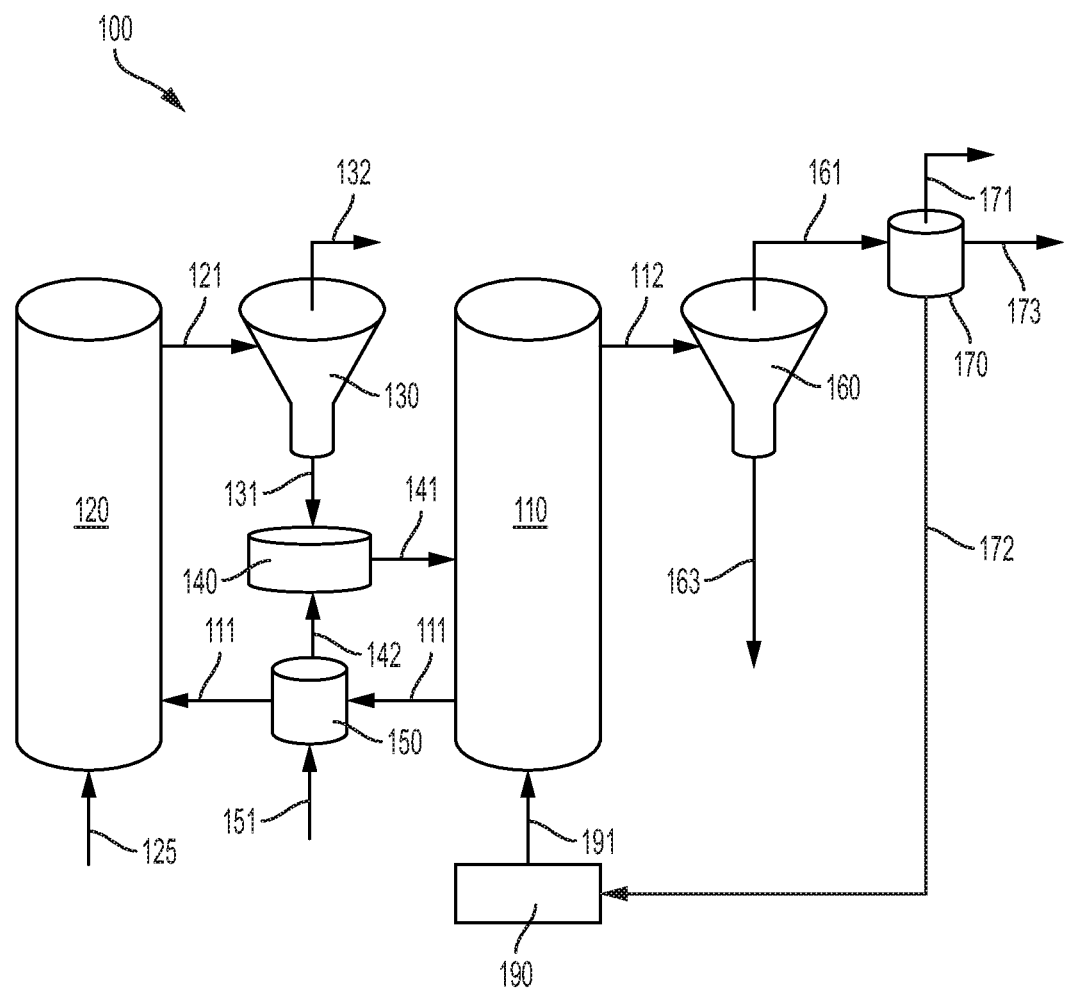
FIG. 1 schematically depicts a chemical looping system for oxidative hydrocarbon cracking according to embodiments disclosed and described.

An embodiment of a chemical looping system for oxidative catalytic hydrocarbon cracking (referred to in this description as a chemical looping system) is schematically depicted in FIG. 1. The chemical looping system 100 comprises a first reaction zone 110 and a second reaction zone 120 fluidly coupled with the first reaction zone 110. In one or more embodiments, and still referring to FIG. 1, the chemical looping system 100 may further comprise a first separator 130 that is fluidly coupled with the first reaction zone 110 and the second reaction zone 120; a second separator 160 that is fluidly coupled to the first reaction zone 110; a hydrocarbon separation unit 170 that is fluidly coupled to the second separator 160; an optional stripper may be fluidly coupled with the second separator 160 and the first reaction zone 110, and a feed storage unit 190 that is fluidly coupled with the first reaction zone 110 and the hydrocarbon separation unit 170. In embodiments, the hydrocarbon separation unit 170 includes multiple components needed to separate the product stream to individual chemicals (propylene, ethylene, hydrogen, benzene, etc). The hydrocarbon separation unit 170 can, in one or more embodiments, comprise a train of compressors, heat exchangers, distillation columns and extraction units.

Chemical looping processes for oxidative catalytic hydrocarbon cracking according to embodiments will now be described with reference to the figures. Referring to FIG. 1, a feed stream 191 is fed from the feed stream storage unit 190 and introduced into the first reaction zone 110. In some embodiments, the material comprising the feed stream 191 may be held in a feed storage unit 190 that is fluidly coupled to the first reaction zone 110. The feed storage unit 190 is, in some embodiments, a vessel that stores feed that will be sent to the first reaction zone 110. However, in other embodiments, the feed storage unit 190 is merely a unit where recycle streams are combined with raw hydrocarbon-containing streams, such as, for example crude oil.

In one or more embodiments, the first reaction zone 110 comprises a moving catalyst bed reactor that comprises a heterogeneous catalyst. In embodiments, the first reaction zone 110 is a reduction reactor. In the first reaction zone 110, the feed stream 191 reacts with the heterogeneous catalyst and form a spent heterogeneous catalyst stream 111 and a first product stream 112, both of which exit the first reaction zone 110. The first reaction zone 110, and the reactions that take place in the first reaction zone 110, will be described subsequently in more detail.

With reference again to FIG. 1, spent (e.g., reduced) heterogeneous catalyst exits the first reaction zone 110 through a spent heterogeneous catalyst stream 111, where it is ultimately introduced into the second reaction zone 120.

According to embodiments, the second reaction zone 120 is configured to receive spent heterogeneous catalyst from the first reaction zone 110, such as by spent catalyst stream 111. In some embodiments, the second reaction zone 120 is an oxidation reactor. The second reaction zone 120 is also configured to receive an oxygen-containing stream 125 that is used, in some embodiments, to oxidize the spent catalyst received from the first reaction zone 110 to form a regenerated catalyst. The oxygen-containing gas can be most gases that contain oxygen. In one or more embodiments, the oxygen-containing stream 125 is air. The second reaction zone 120 is configured so that the regenerated catalyst exits the second reaction zone 120 at an end of the second reaction zone 120 that is opposite of the end of the second reaction zone 120 where the spent catalyst is received. Although the embodiment depicted in FIG. 1 shows that the second reaction zone 120 is configured so that the oxygen-containing stream 125 is received at the same end of the second reaction zone 120 where the spent catalyst is received, it should be understood that in other embodiments, the second reaction zone 120 may be configured so that the oxygen-containing stream 125 is received at any number of locations. In embodiments, the second reaction zone 120 is a risor, downer, or counter-current moving bed reactor.

Referring again to FIG. 1, as previously discussed, in the second reaction zone 120 spent heterogeneous catalyst mixes with the oxygen source in the oxygen-containing stream 125, where the heat-generating metal oxide component reacts with the oxygen source in the oxygen-containing stream 125 in an oxidation reaction. The regenerated (e.g., oxidized) heterogeneous catalyst can then be recycled back to the first reaction zone 110. In addition to the oxidation reaction that occurs between the oxygen source and the heat-generating metal oxide, the cracking catalyst is, in one or more embodiments, also regenerated in the second reaction zone 120 by heating to thereby combust coke or other build-up that accumulated on the cracking catalyst. The regeneration of the cracking catalyst can take place, in one or more embodiments by burning coke deposited using oxygen rich stream, which generally takes place at slightly higher temperature and pressure than a cracking reactor, such as from 400° C. to 800° C. and at pressures from 1 bar to 60 bar. In embodiments, the residence time may be from 1 sec to 3 hours.

As previously noted, the heat-generating metal oxide component of the spent heterogeneous catalyst reacts with the oxygen source in the oxygen-containing gas stream 125 via an oxidation reaction, thereby regenerating (e.g., oxidizing) the spent heat-generating metal oxide component— which underwent a reduction reaction in the first reaction zone—so that it may be re-used in the first reaction zone 110. In addition, this oxidation reaction produces heat that can be used to regenerate the cracking catalyst, or that can be transferred from the second reaction zone 120 to the first reaction zone 110 to fuel the endothermic hydrogen cracking. The heat generated in the second reaction zone 120 may be transferred to the first reaction zone 110 by any known or hereafter formulated heat transfer mechanism, and will vary from situation to situation. For example, and without limitation, the heat generated in the second reaction zone 120 may be transferred to the first reaction zone 110 by heat recovery pipes or hot recirculating heterogeneous catalyst.

After the heterogeneous catalyst has been regenerated in the second reaction zone 120, it exits the second reaction zone 120 as a regenerated (e.g., oxidized) heterogeneous catalyst stream 121. The regenerated heterogeneous catalyst stream 121 is, in some embodiments, fed to a first separator 130. The first separator 130 is configured to separate various components of the regenerated catalyst steam 121. The type of separator used as the first separator 130 is not limited so long as it is capable of separating the regenerated catalyst from other components in the regenerated heterogeneous catalyst stream 121. In some embodiments, the first separator 130 is a cyclone separator. One exemplary cyclone separator that can be used is an Emtrol-Buell Cyclone manufactured by Ceco Environmental for FCC cyclones. The gaseous components separated from the regenerated heterogeneous catalyst stream 121 are discarded from the first separator 130 and the chemical looping system 100 as a byproduct stream 132. The byproduct stream 132 may comprise any number of gases, but, in some embodiments, the byproduct stream 132 comprises steam and $CO_2$. The regenerated heterogeneous catalyst that has been separated from the regenerated heterogeneous catalyst stream 121 exits the first separator 130 as a separated heterogeneous catalyst stream 131.

In some embodiments, the separated heterogeneous catalyst stream 131 is ultimately introduced into the first reaction zone 110. Before the separated heterogeneous catalyst stream 131 reaches the first reaction zone 110 it may optionally be heated in a second heater 140. The optional second heater 140 is configured to be fluidly coupled to the first separator 130 and the first reaction zone 110 such that the separated regenerated catalyst stream 131 may be heated before it enters the first reaction zone 110. Although the second heater 140 is shown as a separate unit in FIG. 1, in some embodiments, the separated heterogeneous catalyst stream 131 is pre-heated in the first reaction zone 110. It should be understood that in some embodiments, the separated heterogeneous catalyst stream 131 is sent directly to the first reaction zone 110 without being sent to a second heater 140. In embodiments comprising a second heater 140, the separated heterogeneous catalyst stream 131 exits the second heater 140 as a heated heterogeneous catalyst stream 141 and is transferred to the first reaction zone 110 where it is introduced as the heterogeneous catalyst.

Treatment of the product that exits the first reaction zone 110 as a first product stream 112 will be discussed with reference to FIG. 1. In embodiments, the first product stream 112 comprises methane and $C_2$ to $C_{8+}$ hydrocarbons. The ratio of olefins and aromatics in the first product stream 112 to hydrocarbons introduced into the first reaction zone 110, such as via the feed stream 191, is from 0.20 to 0.75, such as from 0.30 to 0.65, from 0.40 to 0.55, or from 0.45 to 0.50. According to one or more embodiments, the first product stream 112 comprises from 5 wt % to 70 wt % $C_2$ to $C_3$ olefins, such as from 10 wt % to 60 wt % $C_2$ to $C_3$ olefins, from 20 wt % to 50 wt % $C_2$ to $C_3$ olefins, or from 30 wt % to 40 wt % $C_2$ to $C_3$ olefins. In embodiments, the first product stream 112 comprises from 2 wt % to 30 wt % $C_6$ to $C_8$ aromatics, such as from 5 wt % to 25 wt % $C_6$ to $C_8$ aromatics, from 10 wt % to 20 wt % $C_6$ to $C_8$ aromatics, or from 12 wt % to 15 wt % $C_6$ to $C_8$ aromatics. In further embodiments, the $C_2$ to $C_3$ olefins in the first product stream 112 are ethylene and propylene. A weight ratio of ethylene to propylene in the first product stream 112 is, in embodiments, from 0.2 to 5.0, such as from 0.5 to 4.5, from 1.0 to 4.0, from 1.5 to 3.5, or from 2.0 to 3.0.

In embodiments, the first product stream 112 may comprise small amounts of spent heterogeneous catalyst that is carried from the first reaction zone 110 with the first product stream 112. Accordingly, in one or more embodiments, the first product stream 112 is introduced into a second separator 160. The second separator 160 is fluidly coupled to the first reaction zone 110 and configured to receive a first product stream 112. The type of separator used as the second separator 160 is not limited so long as it is capable of separating the spent heterogeneous catalyst from other components in the first product stream 112. In some embodiments, the second separator 160 is a cyclone separator, such as the cyclone separators previously described. In embodiments, the spent heterogeneous catalyst that has been separated from the first product stream 112 exits the second separator 160 as a separated spent heterogeneous catalyst stream 163.

The separated spent heterogeneous catalyst stream 163 may, in some embodiments, then be sent to an optional stripper (not shown). The stripper may be fluidly coupled to the second separator 160, the feed storage unit 190, and the first reaction zone 110. The optional stripper is configured to receive spent heterogeneous catalyst from the second separator 160 and further separate the heterogeneous catalyst from hydrocarbon components that may be present with the spent heterogeneous catalyst. The separated hydrocarbons are then recycled to the feed storage unit 190 and the spent heterogeneous catalyst is transferred to the first reaction zone 110. In embodiments, the optional stripper is a vessel that provides maximum contact between catalyst and stripping steam. In various embodiments, the optional stripper can have different configurations of internal trays, grids or packing. One exemplary type of stripper is a ModGrid Stripper. At the optional stripper, any remaining hydrocarbons in the separated spent heterogeneous catalyst stream 163 are separated from the spent heterogeneous catalyst. The spent heterogeneous catalyst exits the optional stripper as a final spent heterogeneous catalyst stream.

In one or more embodiments a catalyst cooler 150 may be positioned between, and fluidly coupled to, the first reaction zone 110 and the second reaction zone 120 to recover excess heat from the catalyst. The recovered heat could, in embodiments, be used for steam generation or feed preheating. The catalyst cooler 150 could, in some embodiments, be a shell and tube heat exchanger.

In embodiments, the cracking effluent stream 161 comprises hydrogen, CO, $CO_2$, paraffins, olefins and aromatics. The cracking effluent stream 161 is, in one or more embodiments, sent to a hydrocarbon separation unit 170. In some embodiments, the hydrocarbon separation unit 170 separates the hydrocarbons in the cracking effluent stream 161 into three product streams. The first product stream is a methane stream 171 that is collected for further use or discarded. The second product stream is a $C_4$ to $C_5$ hydrocarbon stream 172 that is recycled by sending the $C_4$ to $C_5$ hydrocarbon stream 172 to the feed storage unit 190, where the $C_4$ to $C_5$ hydrocarbon stream 172 is introduced into the first reaction zone 110 with the feed stream 191. The third product stream is a $C_2$ and $C_3$ olefins stream 173 that is collected and used as products for other processes. However, in other embodiments, other separations may be achieved in the hydrocarbon separation unit 170.

As previously disclosed, process streams comprising hydrocarbons are recycled back into the feed storage unit 190 where they may be combined with hydrocarbon-containing feed, such as, for example, crude oil. The ratio of hydrocarbons from the recycle stream or streams to the hydrocarbons from the hydrocarbon containing feed is, in embodiments, from 0.10 to 0.75, such as from 0.20 to 0.65, from 0.30 to 0.55, or from 0.40 to 0.45.

In yet another embodiment depicted in FIG. 1 a hydrocarbon separation unit 170 is fluidly coupled to the second separator 160 and configured to receive cracking effluent stream 161. The hydrocarbon separation unit 170 is not particularly limited and is configured to separate heavy olefins and aromatics—such as $C_{10+}$ olefins and aromatics—from light olefins and aromatics—such as, for example $C_{8-}$ olefins and aromatics. For example, in embodiments, the hydrocarbon separation unit 170 is configured to separate the cracking effluent stream 161 into methane, $C_2$ and $C_3$ olefins, $C_{4+}$ olefins, and aromatics. The methane and light olefins and aromatics are collected to be used as products or as feed streams for other chemical processes. According to one or more embodiments, the hydrocarbon separation unit 170 is fluidly coupled to the feed storage unit 190 and is configured so that the heavy olefins and aromatics exit the hydrocarbon separation unit 170 and are transferred to the feed storage unit 190. In embodiments, the hydrocarbon separation unit 170 may include conventional hydrocarbon separating mechanisms, such as distillation trains and condensation.

The first reaction zone 110, and the reactions that occur in the first reaction zone 110, will not be discussed with reference to FIGS. 2, 3A, and 3B. With reference now to embodiments depicted in FIG. 2, the feed stream 191 enters the first reaction zone 110 at a second end 110b. The feed stream 191 may be any hydrocarbon-containing stream and, in one or more embodiments, the hydrocarbon in the feed stream 191 includes one or more of whole range crude oil, distilled crude oil, residue oil, topped crude oil, liquefied petroleum gas (LPG), naphtha, gas oil, product streams from oil refineries, product streams from steam cracking processes, liquefied coals, liquid products recovered from oil or tar sands, bitumen, oil shale, biomass hydrocarbons, and the like. In one or more embodiments, the feed stream 191 comprises cracking assistants in addition to the hydrocarbons. Exemplary cracking assistants include, for example, steam, $CO_2$, methanol, ethanol, formaldehyde, and mixtures thereof. In one or more embodiments, the cracking assistant comprises steam, and the steam is, in some embodiments, introduced into the first reaction zone 110 in an amount such that a weight ratio of the steam to hydrocarbons in the feed stream 191 is from 0.1 to 2.0, such as from 0.5 to 1.5, from 0.7 to 1.3, or from 0.9 to 1.1.

Figure 2:
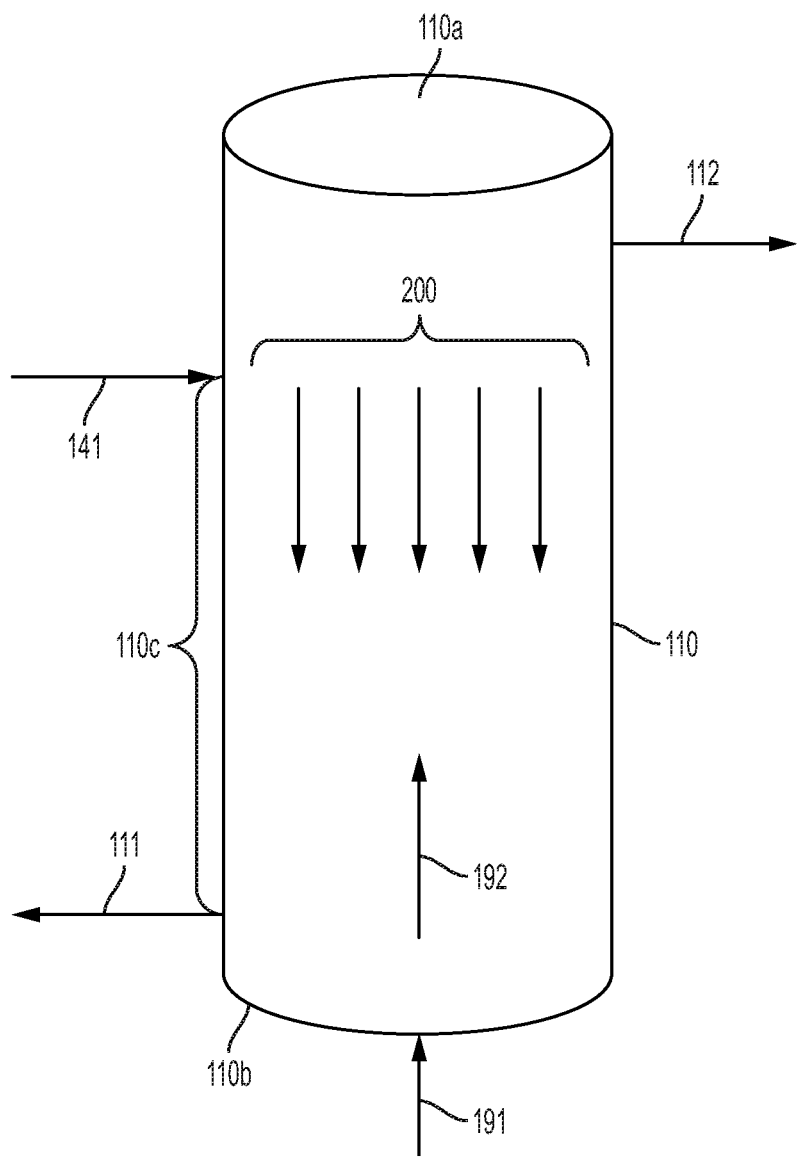
FIG. 2 schematically depicts a first reaction zone of a chemical looping system of oxidative catalytic hydrocarbon cracking according to embodiments disclosed and described.

Still referring to FIG. 2, according to various embodiments, the first reaction zone 110 is configured so that heterogeneous catalyst is introduced into the first reaction zone 110 at or near a first end 110a of the first reaction zone 110, such as in a catalyst stream 141. The moving catalyst bed reactor is configured so that the heterogeneous catalyst 200 moves through the moving catalyst bed reactor from a position at or near the first end 110a of the first reaction zone 110 to a second end 110b of the first reaction zone 110. The first reaction zone 110 is also configured, in various embodiments, so that a feed stream 191 is introduced at the second end 110b of the first reaction zone 110 and moves from the second end 110b of the first reaction zone 110 to the first end 110a of the first reaction zone 110. The flow of the heterogeneous catalyst 200 from the first end 110a of the first reaction zone 110 to the second end 110b of the first reaction zone 110 combined with the flow of the feed stream 191 from the second end 110b of the first reaction zone 110 to the first end 110a of the first reaction zone 110 creates a counter current flow of the heterogeneous catalyst 200 and the feed stream 191 such that the feed stream 191 has adequate time to react with the heterogeneous catalyst 200 and form products such as, for example, olefins and aromatics. When the feed stream 191 first contacts the heterogeneous catalyst 200, reactions occur and cracking of the feed stream 191 begins and the composition of the feed stream 191 begins to change into cracked feed stream 192 shortly after the feed stream 191 enters the first reaction zone.

The first reaction zone 110 is further configured, according to one or more embodiments, so that the products exit the first reaction zone 110 at or near the first end 110a of the first reaction zone 110, such as in first products stream 112. Also, in one or more embodiments, the first reaction zone 110 is configured so that spent heterogeneous catalyst exits the first reaction zone 110 at or near the second end 110b of the first reaction zone 110, such as in a spent heterogeneous catalyst stream 111. The heterogeneous catalyst 200 present in the first reaction zone 110 is subsequently described in more detail.

In embodiments, the heterogeneous catalyst is a heat generating catalyst that comprises at least one cracking catalyst and at least one metal oxide heat-generating component. To form the heterogeneous catalyst, at least one metal oxide precursor corresponding to the at least one metal oxide is dispersed within a microstructure of the cracking catalyst (or physically mixed with the cracking catalyst).

In at least one embodiment, the cracking catalyst is a Mordenite Framework-Inverted (MFI) zeolite catalyst. The ratio of MFI zeolite catalyst to metal oxide in the heat generating catalyst is between 50:50 and 99:1 on a weight basis. There is a trade-off between catalyst and metal oxide percentages. Specifically, increases in the weight percentage of metal oxide provide additional heat generating metal oxide during the reduction reaction allowing for hotter or longer sustained heat generation. However, an increase in metal oxide percentage may result in reduced catalyst activity of the MFI zeolite catalyst. In further embodiments, the ratio of MFI zeolite catalyst to metal oxide in the heat generating catalyst is between 70:30 and 85:15 on a weight basis, between 70:30 and 80:20 on a weight basis, and between 75:25 and 85:15 on a weight basis. In at least one embodiment, the ratio of MFI zeolite catalyst to metal oxide in the heat generating catalyst is between 79:21 and 81:19 on a weight basis. Without being bound by any theory, it is believed that the metal oxide may modify the acid sites on the MFI zeolite in a way that may affect the cracking activity in addition to generating heat. The modification of the acid sites may ultimately increase or decrease the catalyst activity of the MFI zeolite catalyst and adjust the selectivity of resultant species in the product stream. The modification of acid sites is dependent upon the metal oxide, the MFI zeolite, and the quantities of each utilized in the heat generating catalyst.

Various components are contemplated for the cracking catalyst. In one or more embodiments, the cracking catalyst may include an aluminosilicate zeolite, a silicate (for example, silicalite), or a titanosilicate. In further embodiments, the solid acid cracking catalyst is an aluminosilicate zeolite having an MFI structure. For example and not by way of limitation, the MFI zeolite catalyst may be a ZSM-5 catalyst. In a further embodiment, the ZSM-5 catalyst may be an H-ZSM-5 catalyst where at least a portion of the ZSM-5 catalyst ion exchange sites are occupied by H+ ions. Moreover, the MFI zeolite catalyst, for example, the H-ZSM-5 catalyst, may have a Si/Al molar ratio of at least 15. In further embodiments, MFI zeolite catalyst may have a Si/Al molar ratio of at least 20, or at least 35, or at least 45. Additionally, the MFI zeolite catalyst may have an average particle size which varies depending on the application for use. For example, the MFI zeolite catalyst may have an average particle size of 50 to 120 micrometers (µm) when used in a fluid catalyzed application.

The conversion of the metal oxide precursor to a metal oxide provides sites dispersed throughout the microstructure of the cracking catalyst for heat generation as a result of a reduction reaction of the metal oxide. In at least one particular embodiment, the generated metal oxide is a copper oxide. In various embodiments, the metal oxide is at least one of an oxide of iron, copper, zinc, chromium, molybdenum, vanadium, cerium, manganese, bismuth, silver, cobalt, zirconium, tungsten, magnesium, and their combinations.

In at least one embodiment, the metal oxide precursor is a hydrate of a metal salt of nitric acid. Non-limiting examples include, copper nitrate trihydrate ($Cu(NO_3)_2 \cdot 3H_2O$), cobalt(II) nitrate hexahydrate ($Co(NO_3)_2 \cdot 6H_2O$), and chromium (III) nitrate nonahydrate ($Cr(NO_3)_3 \cdot 9H_2O$).

In one or more embodiments, the heat generating catalyst further comprises a promoter. Non-limiting examples of promoters include an alkali metal, an alkaline earth metal, a rare earth metal, a transition metal, phosphorous, and their combinations.

As shown in FIG. 2 the cracked feed stream 192 moves through the first reaction zone 110 from the second end 110b of the first reaction zone 110 to the first end 110a of the reaction zone 110. At the same time, according to embodiments, a heterogeneous catalyst 200 is introduced into the first reaction zone 110 at or near the first end 110a of the first reaction zone 110, such as in a heterogeneous catalyst stream 141. According to one or more embodiments, the heterogeneous catalyst 200 that is introduced into the first reaction zone 110 comprises the cracking catalyst and the heat-generating metal oxide component as described in this description. The first reaction zone of one or more embodiments is a moving catalyst bed reactor that moves the heterogeneous catalyst from the position at or near the first end 110a of the first reaction zone 110, where the heterogeneous catalyst was introduced into the first reaction zone 110, to the second end 110b of the first reaction zone 110. This movement may be carried out by gravity. The movement of the feed stream 191 from the second end 110b to the first end 110a of the first reaction zone 110 and the heterogeneous catalyst 200 from the first end 110a to the second end 110b of the first reaction zone 110 allows the cracked feed stream 192 and the heterogeneous catalyst 200 to intermingle in a catalytic reaction zone 110c of the first reaction zone 110. As used in this description, the catalytic reaction zone 110c of the first reaction zone 110 is any portion of the first reaction zone 110 that comprises the heterogeneous catalyst. For instance, and by example only, if the heterogeneous catalyst is introduced into the first reaction zone 110 at a position that is not the first end 110a of the first reaction zone 110, the catalytic reaction zone 110c does not include the space between the first end 110a of the first reaction zone 110 and the position where the heterogeneous catalyst 200 is introduced. Similarly, if the heterogeneous catalyst 200 is removed from the first reaction zone 110 away from the second end 110b of the first reaction zone 110, the catalytic reaction zone 110c does not include the portion of the first reaction zone 110 between the second end 110b of the first reaction zone 110 and the position where the heterogeneous catalyst 200 is removed from the first reaction zone 110.

As the cracked feed stream 192 and the heterogeneous catalyst 200 intermingle, the cracking catalyst of the heterogeneous catalyst 200 cracks the hydrocarbons in the feed stream 191 into a first product stream 112 comprising hydrogen, methane, $C_2$ to $C_{5+}$ olefins, $C_2$ to $C_{5+}$ aromatics, and various byproducts. This cracking reaction is very endothermic and requires significant amounts of heat to further the cracking reaction. As the cracking catalyst is cracking the hydrocarbons in the cracked feed stream 192, the heat-generating metal oxide component is reduced in the first reaction zone 110 by the cracking products or hydrogen generated by the cracking process. An exemplary reduction reaction is:

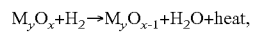

$$M_yO_x + H_2 \rightarrow M_yO_{x-1} + H_2O + heat,$$

Where the heat-generating metal oxide is $M_yO_x$ ("M" being the metal component) and "y" and "x" represent the number of atoms in each molecule. The heat generated from the reduction of the heat-generating metal oxide component is used, at least in part, to fuel the endothermic cracking reaction. In one or more embodiments, at least one of hydrogen and oxygen are introduced into the first reaction zone 110 to promote reduction of the heat-generating metal oxide component.

Referring again to FIG. 2, using the heat-generating metal oxide component with the cracking catalyst allows a heat gradient to be present in the catalytic reaction zone 110c of the first reaction zone 110. The heat-generating metal oxide component of the heterogeneous catalyst that enters the first reaction zone 110 has not been reduced and, thus, more reduction reactions will occur where the heterogeneous catalyst is introduced into the first reaction zone 110, such as at or near the first end 110a of the first reaction zone 110. As the heterogeneous catalyst 200 moves from a position at or near the first end 110a of the first reaction zone 110 toward the second end 110b of the first reaction zone 110, more of the heat-generating metal oxide component is reduced and, thus, there is less of the heat-generating metal oxide component available to undergo the reduction reactions. Accordingly, a maximum amount of reduction reactions occur in the catalytic reaction zone 110c nearest the first end 110a of the first reaction zone 110, and the amount of reduction reactions decreases as the heterogeneous catalyst moves in a direction from the first end 110a to the second end 110b of the first reaction zone 110, reaching a minimum number of reduction reactions occurring in the catalytic reaction zone 110c nearest the second end 110b of the first reaction zone 110. Because the reduction reactions produce heat, it follows that the temperature of the catalytic reaction zone 110c in the first reaction zone 110 is highest at the end of the catalytic reaction zone 110c nearest the first end 110a of the first reaction zone 110 and the temperature of the catalytic reaction zone 110c gradually decreases as the distance from the first end 110a of the first reaction zone 110 increases. The temperature within the catalyst reaction zone 110c has a minimum at the portion of the catalytic reaction zone 110c nearest the second end 110b of the first reaction zone 110. This temperature gradient within the catalytic reaction zone 110c of the first reaction zone 110 helps to promote hydrocarbon cracking by allowing spent heterogeneous catalyst 200 to contact the fresh feed stream 191, which easily cracked even at lower temperatures at or near the second end 110b of the first reaction zone 110, while the fresh heterogeneous catalyst 200 is contacted with the cracked feed stream 192, which is more difficult to crack, at high temperatures at or near the first end 110a of the first reaction zone 110. In embodiments, both the maximum and minimum temperature within the catalyst reaction zone 110c are within the range that the feed can be cracked, such as, for example from 400° C.-800° C., or from 500° C.-700° C., or about 650° C.

The temperature gradient formed in the catalytic reaction zone 110c is created, at least in part, by the heat released when the heat-generating metal oxide component is reduced and by the difference in cracking conversion levels (e.g., in portions of the catalytic reaction zone 110c where more conversion occurs will consume more heat than portions of the catalytic reaction zone 110c where less conversion occurs). As previously stated, the reduction reactions occur when hydrogen or hydrocarbon products produced by the hydrocarbon cracking react with the heat-generating metal oxide component. Therefore, in embodiments, the temperature gradient within the catalytic reaction zone 110c is controlled by one or more of the following steps (1) varying the catalyst to oil ratio in the reaction zone 110, (2) controlling the loading of heat-generating metal oxide components that are impregnated into the cracking catalyst, (3) controlling the contact time between the cracked feed stream 192 and the catalyst 200, (4) controlling the composition of the feed stream 191, and (5) the reactor design parameters.

As previously noted, a temperature gradient is created in the catalytic reaction zone 110c of the first reaction zone 110 such that a maximum temperature in the catalytic reaction zone 110c is at a position nearest to the first end 110a of the first reaction zone 110, and a minimum temperature in the catalytic reaction zone 110c is at a position nearest to the second end 110b of the first reaction zone 110. In some embodiments the temperature gradient is constant across the catalytic reaction zone 110c in a direction from the first end 110a to the second end 110b of the first reaction zone 110, meaning that a plot of the change in temperature in a direction from the first end 110a to the second end 110b of the first reaction zone 110 versus the distance from the point where the heterogeneous catalyst 200 is introduced into the first reaction zone would be linear.

Figure 3A:
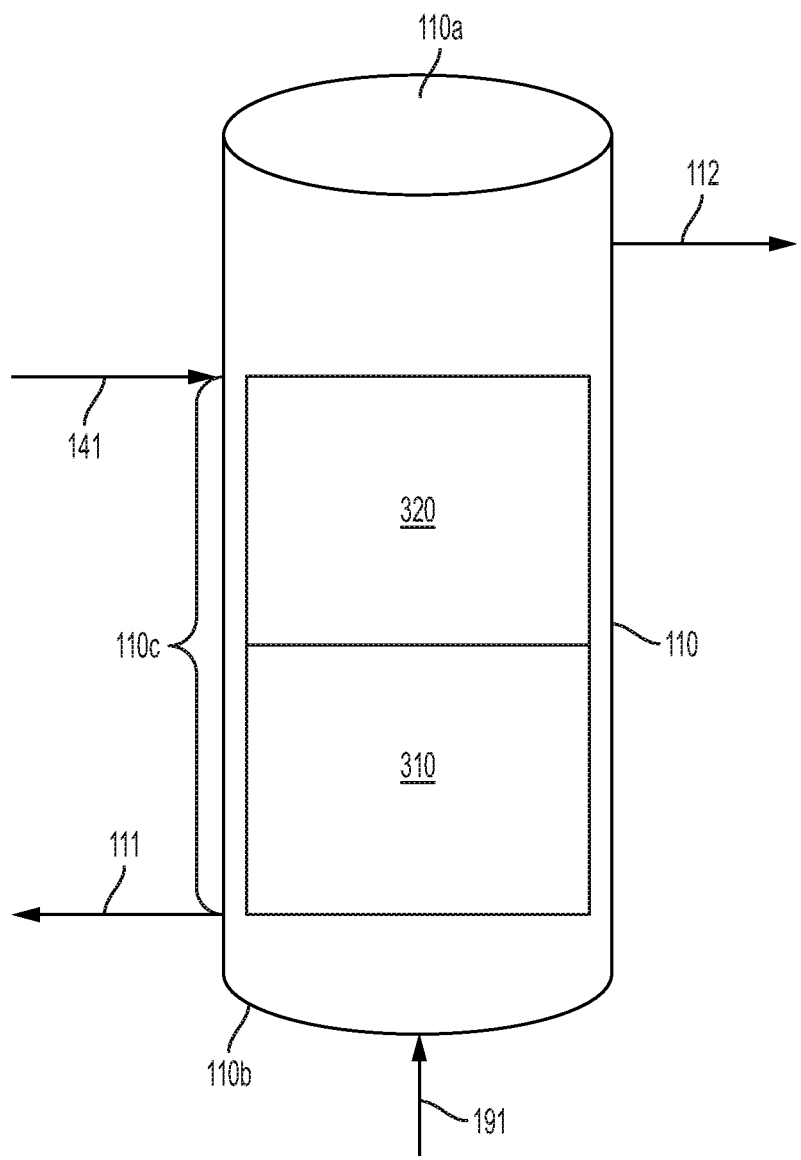
FIG. 3A schematically depicts a first reaction zone of a chemical looping system for oxidative catalytic hydrocarbon cracking having two fixed temperature zones according to embodiments disclosed and described.
Figure 3B:
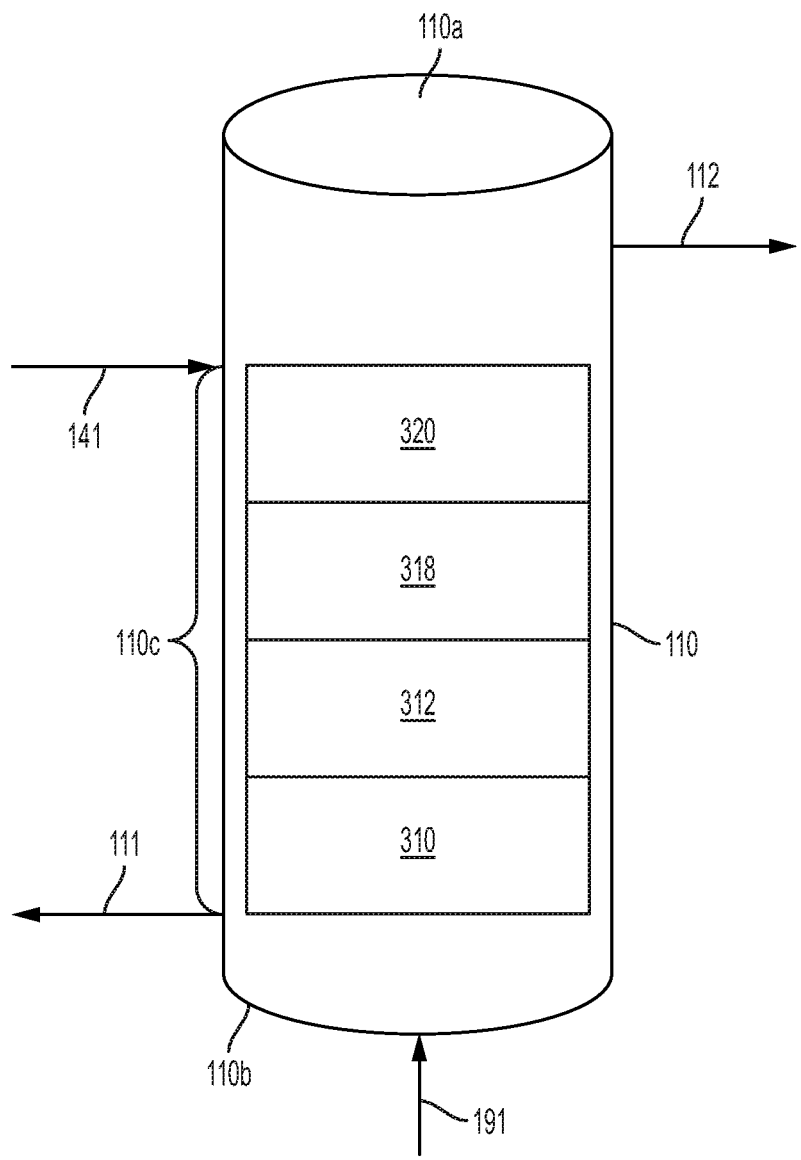
FIG. 3B schematically depicts a first reaction zone of a chemical looping system for oxidative catalytic hydrocarbon cracking having four fixed temperature zones according to embodiments disclosed and described.

In other embodiments, and with reference to FIG. 3A, the temperature gradient within the catalytic reaction zone 110c is not constant. In some embodiments, the temperature gradient may be maintained as a series of discrete fixed temperature zones that extend in an operative direction of the first reaction zone 110 from the first end 110a of the first reaction zone 110 to the second end 110b. The series of fixed temperature zones may comprise any number of fixed temperature zones, but the series of fixed temperature zones comprises at least two fixed temperature zones. Within each of the fixed temperature zones, the temperature is significantly constant, which means that a temperature gradient within each fixed temperature zone is less than 5° C., such as less than 3° C., or less than 1° C. In one or more embodiments, a first fixed temperature zone 310 is proximate to a position where the feed stream 191 is introduced into the first reaction zone 110 (e.g., proximate to the second end 110b of the first reaction zone 110), and a second fixed temperature zone 320 is proximate to a position where the product stream 112 is removed from the first reaction zone 110 (e.g., proximate to the first end 110a of the first reaction zone 110). The temperature in the second fixed temperature zone 320 is greater than a temperature in the first fixed temperature zone 310. The volume of the first fixed temperature zone 310 and the volume of the second fixed temperature zone 320 may be the same in some embodiments, but in other embodiments, the volume of the first fixed temperature zone 310 and the volume of the second fixed temperature zone 320 may differ.

In other embodiments, any number of fixed temperature zones may be present between the previously described first fixed temperature zone 310 and the second fixed temperature zone 320. For example, as depicted in FIG. 3B, a third fixed temperature zone 312 and a fourth fixed temperature zone 318 are positioned between the first fixed temperature zone 310 and the second fixed temperature zone 320. The third fixed temperature zone 312 is proximate to the first fixed temperature zone 310 and the fourth fixed temperature zone 318 is proximate to the second fixed temperature zone 320. The temperature in the third fixed temperature zone 312 is greater than the temperature in the first fixed temperature zone 310 and less than the temperature in both the fourth fixed temperature zone 318 and the second fixed temperature zone 320. The temperature in the fourth fixed temperature zone 318 is less than the temperature in the second fixed temperature zone 320 and greater than the temperature in the third fixed temperature zone 312 and the temperature in the first fixed temperature zone 310. It should be understood that any number of fixed temperature zones may be positioned between the first fixed temperature zone 310 and the second fixed temperature zone 320, where the temperature in each subsequent fixed temperature zone is greater than the temperature in the preceding fixed temperature zone as the fixed temperature zones proceed from the first temperature zone 310 to the second fixed temperature zone 320.

In one or more embodiments, the temperature within the first reaction zone 110 during the hydrocarbon cracking is, in one or more embodiments, from 400° C. to 800° C., such as from 450° C. to 750° C., from 500° C. to 700° C., or from 550° C. to 650° C. In other embodiments, the temperature within the first reaction zone 110 during the hydrocarbon cracking is from 500° C. to 650° C. The pressure within the first reaction zone 110 during the hydrocarbon cracking is, in various embodiments, from atmospheric pressure (e.g., about 1 bar) to 60 bar, such as from 10 bar to 50 bar, from 20 bar to 40 bar, or from 25 bar to 35 bar. The residence time of the heterogeneous catalyst 200, the feed stream 191, or both in the first reaction zone 110 is from 1 sec to 3 days, such as, in some embodiments, from 1 sec to 3 hours, and depends on the deactivation rate of the heterogeneous catalyst 200 and the type of feed stream 191 that is used.

EXAMPLES

The efficacy of three catalysts was tested in the following examples

Example 1

The catalyst of Example 1 was H-ZSM-5 Si/Al=38 loaded with 20 wt. % copper (II) oxide that was prepared using copper nitrate trihydrate ($Cu(NO_3)_2.3H_2O$) as a precursor. The catalyst was prepared by dissolving 11.4 g of the copper salt completely in 3.7 g of deionized water, and then the solution was added drop-wise to 15 g of lightly crushed ZSM-5 while stirring. The solid was dried in an oven at 110° C. for 4 hours, and then calcined in air at 650° C. for 4 hours. ICP analysis confirms 19.9% copper oxide loading on zeolites.

Example 2

The catalyst of Example 2 was H-ZSM-5 Si/Al=38 loaded with 20 wt. % cobalt oxide that was prepared using $Co(NO_3)_2.6H_2O$ as a precursor. The catalyst was prepared by dissolving 14.6 g of cobalt salt completely in 4.57 g of deionized water, and then the solution was added drop-wise to 15 g of lightly crushed ZSM-5 while stirring. The solid was dried in an oven at 110° C. for 4 hours, and then calcined in air at 650° C. for 4 hours.

Example 3

The catalyst of Example 3 was H-ZSM-5 Si/Al=38 loaded with 20 wt. % Chromium oxide that was prepared using $Cr(NO_3)_3.9H_2O$ as a precursor. The catalyst was prepared by dissolving 22.1 g of metal salt completely in 13.9 g of deionized water, and then the solution was added drop-wise to 15 g of lightly crushed ZSM-5 while stirring. The solid was dried in an oven at 110° C. for 4 hours, and then calcined in air at 650° C. for 4 hours.

The efficacy of each of the catalysts from Examples 1-3 was tested using the following protocol.

The reactivity of the catalyst samples was tested using a Chemical Reactor Engineering Center (CREC) Riser Simulator. This unit, which is basically a bench scale reactor with a capacity of 55 $cm^3$, was designed for catalyst evaluation and kinetic studies under fluidized bed reactor conditions. The major components of the CREC Riser Simulator are a reactor vessel, vacuum box, a series of sampling valves, a timer, two pressure transducers and three temperature controllers.

The catalysts were evaluated at various temperatures and contact times using Hexane as feed by using the following steps. Solid catalyst loadings were fixed to 0.4 g. For the fluidized reactor, the catalysts were crushed and sieved to a particle size of 50-100 μm. Leak testing was performed after catalyst loading by purging the reactor system with argon then pressurizing it up to 50 psi by closing the outlet valves to look for leeks. At no flow condition, the constant reactor pressure indicates that the reactor is sealed properly. Following the leak test, the system was purged by flowing argon. The temperature programs were started to heat the reactor and the vacuum box to the desired temperature(s). The argon flow was maintained to keep the system from any interference of gas phase oxygen. Once the reactor temperature reached the desired temperature, the argon flow was discontinued. The reactor isolation valve was closed when it reached the desired pressure level. Subsequently, the vacuum box was evacuated by a vacuum pump coupled to the outlet. During the evacuation process, the reactor-vacuum box isolation valve was closed at reactor pressure approximately 14.7 psi. The vacuum pump continued to evacuate the vacuum box until it reached 3.75 psi. Then, the injection syringe was loaded with the desired amount of crude oil feed (0.4 ml) and measured the weight of the crude oil feed and syringe. The reaction time was set by adjusting the timer. The catalyst was fluidized by running the impeller located at the top of the reactor basket. Once the impeller reached the full speed, the feed was injected to the reactor using the preloaded syringe. The reaction was terminated after the pre-specified time; the isolation valve between the reactor and vacuum box opened automatically and transferred all the reactant and products into the vacuum box. Between the feed injections and the termination steps, the pressure profiles of both the reactor and the vacuum box can be monitored to observe the sharp termination. The pressure profile can be used to carry the mass balance.

The conditions for the testing was a temperature of 550° C., a residence time of 5 seconds, a catalyst to oil ratio of 0.7 g/g, and metal oxide loadings of 20 wt %. The results are shown in Table 1.

TABLE 1

| Catalyst | Conversion | $C_2$ Yield % | $C_3$ Yield % |
| --- | --- | --- | --- |
| Comparative example Unmodified H-ZSM-5 | 44 | 5.4 | 7.5 |
| Example 1 CuO/H-ZSM-5 | 40 | 15 | 16.1 |
| Example 2 $Co_2O_3$/H-ZSM-5 | 40 | 9.4 | 14.3 |
| Example 3 $Cr_2O_3$/H-ZSM-5 | 41 | 6.3 | 10 |

As shown in Table 1, each of the catalyst of Examples 1 to 3 performed better in $C_2$ to $C_3$ yield percentage than the unmodified ZSM-5 catalyst. Thus, it is evident from these examples that using a catalyst comprising a heat-generating metal oxide component improves performance of converting hydrocarbons from crude oil to $C_2$ and $C_3$ products.

It should be apparent to those skilled in the art that various modifications and variations can be made to the embodiments described in this disclosure without departing from the spirit and scope of the claimed subject matter. Thus it is intended that the specification cover the modifications and variations of the various embodiments described in this disclosure provided such modifications and variations come within the scope of the appended claims and their equivalents.

What is claimed is:
1. A method of chemical looping comprising:
introducing a hydrocarbon-containing feed stream into a first reaction zone, the first reaction zone comprising a moving catalyst bed reactor, where the moving catalyst bed reactor comprises a heterogeneous catalyst, where the heterogeneous catalyst comprises a heat-generating metal oxide component;

cracking the hydrocarbon-containing feed stream in the presence of the heterogeneous catalyst of the moving catalyst bed reactor to yield a product stream comprising olefins, aromatics, and hydrogen;

reducing the heat-generating metal oxide component of the heterogeneous catalyst with at least one of the olefins, aromatics, and hydrogen from the product stream to generate heat; and utilizing the heat to drive additional cracking of the hydrocarbon-containing feed stream.

2. The method of claim 1, further comprising removing a portion of the heterogeneous catalyst from the first reaction zone to a second reaction zone;

oxidizing the portion of the heterogeneous catalyst in the second reaction zone to form an oxidized heterogeneous catalyst; and transferring the oxidized heterogeneous catalyst from the second reaction zone to the first reaction zone.

3. The method of claim 2, further comprising generating additional heat by oxidizing the portion of the heterogeneous catalyst in the second reaction zone to form an oxidized heterogeneous catalyst, and transferring the additional heat to the first reaction zone.

4. The method of claim 1, further comprising introducing one or more cracking assistants into the first reaction zone.

5. The method of claim 4, where the one or more cracking assistants are selected from the group consisting of steam, carbon dioxide, methanol, ethanol, formaldehydes, and mixtures thereof.

6. The method of claim 4, where the one or more cracking assistants comprise steam, the steam being introduced in an amount such that a weight ratio of the steam to hydrocarbons in the hydrocarbon-containing feed stream is from 0.1 to 2.0.

7. The method of claim 1, further comprising introducing at least one of hydrogen and oxygen into the first reaction zone.

8. The method of claim 1, further comprising:
removing unreacted hydrocarbons from the first reaction zone; and
recycling the unreacted hydrocarbons by re-introducing the unreacted hydrocarbons into the first reaction zone as a recycle stream.

9. The method of claim 8, where a weight ratio of hydrocarbons in the recycle stream to hydrocarbons in the hydrocarbon-containing feed stream is from 0.10 to 0.75.

10. The method of claim 1, where a weight ratio of olefins and aromatics in the product stream to hydrocarbons introduced into the first reaction zone is from 0.2 to 0.75.

11. The method of claim 1, where a product stream comprises from 5 wt % to 70 wt % $C_2$ to $C_3$ olefins.

12. The method of claim 11, where the $C_2$ to $C_3$ olefins comprise ethylene and propylene, and
a weight ratio of ethylene to propylene is from 0.2 to 5.0.

13. The method of claim 1, where the first reaction zone comprises at least a first fixed temperature zone and a second fixed temperature zone,
the first fixed temperature zone is proximate to a position where the hydrocarbon-containing feed stream is introduced to the first reaction zone,
the second fixed temperature zone is proximate to a position where the product stream is removed from the first reaction zone, and
a temperature in the second fixed temperature zone is greater than a temperature in the second fixed temperature zone.

14. The method of claim 1, where the first reaction zone comprises a constant temperature gradient from a position where the hydrocarbon-containing feed stream is introduced into the first reaction zone to a position where the product stream is removed from the first reaction zone,
a maximum temperature is at the position where the product stream is removed from the first reaction zone, and
a minimum temperature is at the position where the hydrocarbon-containing feed stream is introduced into the first reaction zone.

15. The method of claim 1, where the hydrocarbon-containing feed stream is crude oil.

16. A chemical looping system comprising:
a first reaction zone comprising a moving catalyst bed reactor that comprises a heterogeneous catalyst, where the heterogeneous catalyst comprises a heat-generating metal oxide component, where the first reaction zone is configured to:
crack a hydrocarbon-containing feed stream to produce a product stream comprising olefins, aromatics, and hydrogen; and
reduce the heat-generating metal oxide component of the heterogeneous catalyst with the hydrogen from the product stream to generate heat;
a second reaction zone fluidly coupled to the first reaction zone, where the second reaction zone is configured to:
receive reduced heterogeneous catalyst from the first reaction zone;
oxidize the reduced heterogeneous catalyst to form an oxidized heterogeneous catalyst and generate heat; and
transfer the oxidized heterogeneous catalyst to the first reaction zone.

17. The chemical looping system of claim 16, further comprising at least one separator fluidly coupled to the first reaction zone, where the at least one separator is configured to separate spent heterogeneous catalyst from the olefins, aromatics, and hydrogen in the product stream.

18. The chemical looping system of claim 16, further comprising at least one hydrocarbon separation unit fluidly coupled to the first reaction zone, where the at least one hydrocarbon separation unit is configured to separate hydrocarbons in the product stream.

19. The chemical looping system of claim 16, further comprising a second separator fluidly coupled to the second reaction zone, where the second separator is configured to separate the oxidized heterogeneous catalyst from gasses exiting the second reaction zone.

20. The chemical looping system of claim 16, further comprising a catalytic cooler fluidly coupled to one or more of the first reaction zone and the second reaction zone.

* * * * *